US012285954B2

(12) United States Patent
Miyazawa et al.

(10) Patent No.: US 12,285,954 B2
(45) Date of Patent: Apr. 29, 2025

(54) LIQUID EJECTING HEAD AND LIQUID EJECTING APPARATUS

(71) Applicant: SEIKO EPSON CORPORATION, Tokyo (JP)

(72) Inventors: Hiromu Miyazawa, Azumino (JP); Kinya Ozawa, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 155 days.

(21) Appl. No.: 18/107,062

(22) Filed: Feb. 8, 2023

(65) Prior Publication Data

US 2023/0249469 A1 Aug. 10, 2023

(30) Foreign Application Priority Data

Feb. 9, 2022 (JP) ................................ 2022-018903

(51) Int. Cl.
*B41J 2/18* (2006.01)
*B41J 2/175* (2006.01)

(52) U.S. Cl.
CPC ................ *B41J 2/18* (2013.01); *B41J 2/175* (2013.01); *B41J 2202/12* (2013.01)

(58) Field of Classification Search
CPC . B41J 2202/12; B41J 2/18; B41J 2/175; B41J 2/14201; B41J 2/14145; B41J 2002/14362; B41J 2202/08; B41J 2/1408; B41J 2/3358; B41J 29/377
See application file for complete search history.

(56) References Cited

U.S. PATENT DOCUMENTS

2019/0315138 A1 10/2019 Ijima et al.

FOREIGN PATENT DOCUMENTS

JP 2019-181855 A 10/2019

*Primary Examiner* — Jannelle M Lebron
(74) *Attorney, Agent, or Firm* — Harness, Dickey & Pierce, P.L.C.

(57) ABSTRACT

A liquid ejecting head includes a nozzle that is in communication with a pressure chamber and ejects a first liquid, a passage formation substrate that has a liquid passage which extends from a common liquid chamber in communication with a plurality of pressure chambers to the nozzle and through which the first liquid flows, and a circulation passage that is formed in the passage formation substrate, passes near the nozzle, and is not in communication with the liquid passage, and through which a second liquid circulates.

19 Claims, 14 Drawing Sheets

LIQUID EJECTING HEAD AND LIQUID EJECTING APPARATUS

The present application is based on, and claims priority from JP Application Serial Number 2022-018903, filed Feb. 9, 2022, the disclosure of which is hereby incorporated by reference herein in its entirety.

BACKGROUND

1. Technical Field

The present disclosure relates to a liquid ejecting head and a liquid ejecting apparatus that eject a liquid from a nozzle and, in particular, relates to an ink jet recording head and an ink jet recording apparatus that eject ink as a liquid.

2. Related Art

As an ink jet recording head as a representative example of a liquid ejecting head that ejects droplets, there is, for example, an ink jet recording head that includes a nozzle and a passage, such as a pressure chamber, in communication with the nozzle, and ejects ink drops from the nozzle by causing a pressure change in ink in the pressure chamber by using a pressure generation unit. As the pressure generation unit mounted on the liquid ejecting head, there is, for example, a pressure generation unit using a longitudinal vibration piezoelectric element, a flexural vibration piezoelectric element, a heater element, and an electrostatic force.

In such an ink jet recording head, for example, there is a problem in which the temperature of the head increases due to heat generated by an integrated circuit (IC) for driving and the like, as a result of which the viscosity and the like of the ink change, and the ejecting property becomes unstable.

In order to solve such a problem, there is an ink jet recording head that is cooled by water or the like (for example, see JP-A-2019-181855). JP-A-2019-181855 discloses a configuration including a cooling unit that cools an IC for driving the head and the like by circulating water in an upper portion of the head. By cooling the upper portion of the head in this manner, it is possible to attempt to stabilize the ejecting property.

However, it is difficult to sufficiently stabilize the ejecting property by only cooling the upper portion of the head. For example, ink may be exposed to the outside in an opening portion of a nozzle, and the moisture contained in the ink may easily evaporate around the nozzle. Therefore, the composition, the viscosity, and the like of the ink may easily change near the nozzle, as a result of which the ejecting property may deteriorate.

Note that such a problem exists in a similar manner not only in an ink jet recording head that ejects ink, but also in other liquid ejecting heads that eject a liquid other than ink.

SUMMARY

According to an aspect of the present disclosure that solves the above-described problem, a liquid ejecting head includes a nozzle that is in communication with a pressure chamber and ejects a first liquid, a passage formation substrate that has a liquid passage which extends from a common liquid chamber in communication with a plurality of pressure chambers to the nozzle and through which the first liquid flows, and a circulation passage that is formed in the passage formation substrate, passes near the nozzle, and is not in communication with the liquid passage, and through which a second liquid circulates.

According to another aspect of the present disclosure, a liquid ejecting apparatus includes the above-described liquid ejecting head.

DESCRIPTION OF EXEMPLARY EMBODIMENTS

Hereinafter, the present disclosure will be described in detail based on the embodiments. However, the following description illustrates one aspect of the present disclosure, and the configuration of the present disclosure can be appropriately changed within the scope of the disclosure.

In addition, in each figure, X, Y, and Z represent three spatial axes orthogonal to each other. In the specification, the directions of the axes are an X direction, a Y direction, and a Z direction. In the description, the direction in which the arrow in each figure points is a positive (+) direction, and the direction opposite thereto is a negative (−) direction. In addition, the Z direction indicates a vertical direction, the +Z direction indicates vertically downward, and the −Z direction indicates vertically upward. In addition, the three spatial axes of X, Y, and Z whose positive and negative directions are not limited are described as the X-axis, the Y-axis, and the Z-axis.

First Embodiment

Figure 1:
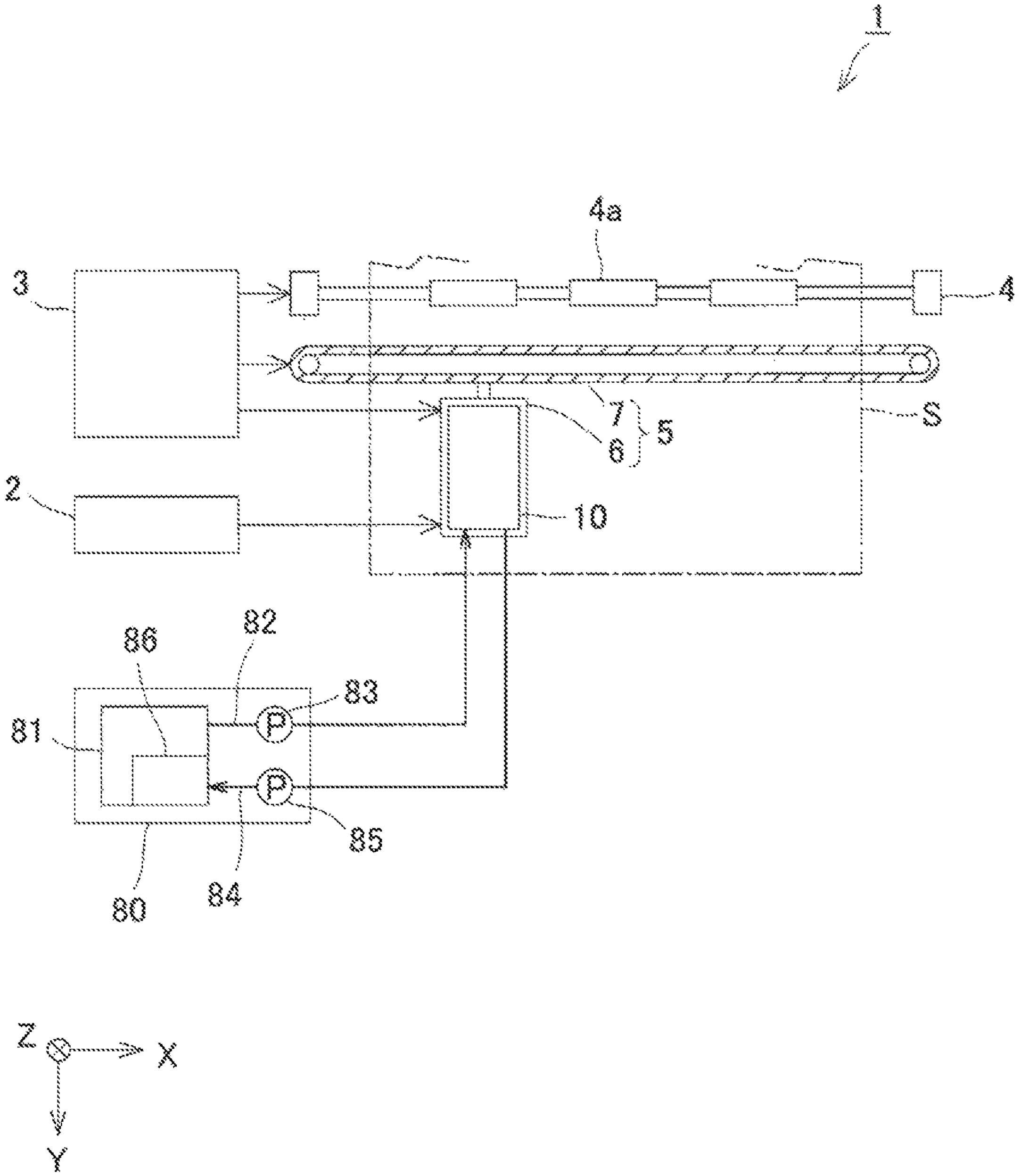
FIG. 1 is a schematic view illustrating an overall configuration of a recording apparatus according to a first embodiment of the present disclosure.

FIG. 1 is a schematic view illustrating an ink jet recording apparatus, which is an example of a liquid ejecting apparatus according to the present disclosure.

The ink jet recording apparatus (hereinafter, also simply referred to as a recording apparatus) according to the present disclosure is a printing apparatus that ejects ink, which is a first liquid, as ink drops onto a medium such as printing paper and causes ink to land and that performs printing of an image and the like by forming a dot arrangement on the medium. Note that as the medium, in addition to recording paper, an appropriate material such as a resin film or a fabric can be used.

In the following description, regarding the three spatial axes of X, Y, and Z, the X-axis is a moving direction (in other words, a main scanning direction) of a recording head described later, the Y-axis is a transporting direction of a medium S orthogonal to the main scanning direction, an X-Y plane is a plane parallel to a liquid ejecting surface in which a nozzle of the recording head is formed, and the Z-axis is a direction that intersects the X-Y plane and, in the present embodiment, a direction orthogonal to the X-Y plane. The ink drops are ejected in the +Z direction of the Z-axis.

As illustrated in FIG. 1, a recording apparatus 1 includes a liquid container 2, a control unit 3, a transporting mechanism 4, a moving mechanism 5, and an ink jet recording head 10 (hereinafter, also simply referred to as a recording head), which is an example of a liquid ejecting head.

The liquid container 2 separately stores a plurality of kinds (for example, a plurality of colors) of ink to be ejected from the recording head 10. Examples of the liquid container 2 include a cartridge that can be attached to and removed from the recording apparatus 1, a bag-shaped ink pack formed of a flexible film, an ink tank that can be filled with ink, and the like. Note that the liquid container 2 stores a plurality of kinds of ink having different colors, components, and the like.

The control unit 3 includes, for example, a control apparatus such as a central processing unit (CPU) or a field programmable gate array (FPGA), and a storage apparatus such as a semiconductor memory. The control apparatus executes a program stored in the storage apparatus, and thus the control unit 3 comprehensively controls each element of the recording apparatus 1, that is, the transporting mechanism 4, the moving mechanism 5, the recording head 10, and the like.

The transporting mechanism 4 is controlled by the control unit 3 to transport the medium S in the Y-axis direction and has a transporting roller 4*a*. That is, the transporting mechanism 4 transports the medium S in the Y-axis direction when the transporting roller 4*a* is rotated. Note that the transporting mechanism 4 that transports the medium S is not limited to having the transporting roller 4*a* and may have, for example, a belt or a drum that transports the medium S.

The moving mechanism 5 is controlled by the control unit 3 and reciprocates the recording head 10 in the X-axis direction. Note that the X-axis direction in which the recording head 10 is reciprocated by the moving mechanism 5 is a direction intersecting the Y-axis direction in which the medium S is transported.

More specifically, the moving mechanism 5 of the present embodiment includes a transporting body 6 and a transporting belt 7. The transporting body 6 is a structure having a substantially box shape accommodating the recording head 10, that is, a so-called carriage, and is fixed to the transporting belt 7. The transporting belt 7 is an endless belt extending in the X-axis direction. The transporting belt 7 rotates under the control of the control unit 3, and thus the recording head 10 is reciprocated in the X-axis direction together with the transporting body 6. Note that the liquid container 2 may be mounted to the transporting body 6 together with the recording head 10.

The recording head 10 ejects ink, supplied from the liquid container 2, from a plurality of nozzles onto the medium S under the control of the control unit 3. In addition, in the recording apparatus 1, ink drops are ejected from the recording head 10 simultaneously with transportation of the medium S by the transporting mechanism 4 and reciprocating movement of the recording head 10 by the moving mechanism 5, as a result of which an image is formed by the ink on a surface of the medium S; that is, so-called printing is performed.

In addition, although the details will be described later, the recording apparatus 1 includes a liquid delivery apparatus 80 that is a liquid delivery unit for supplying a cooling liquid, which is a second liquid, into a circulation passage 70 provided in each recording head 10.

Figure 2:
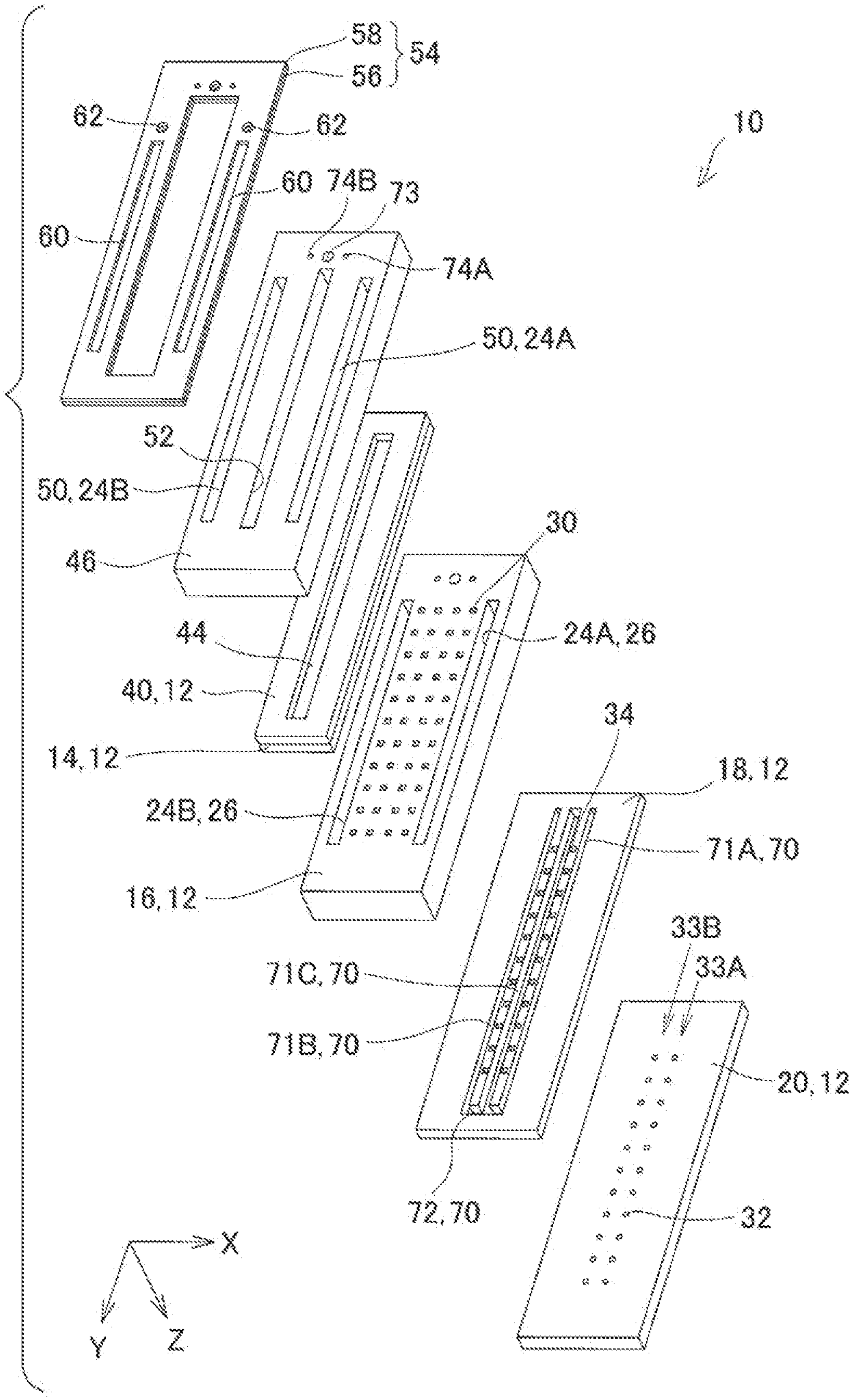
FIG. 2 is an exploded perspective view of a recording head according to the first embodiment of the present disclosure.
Figure 3:
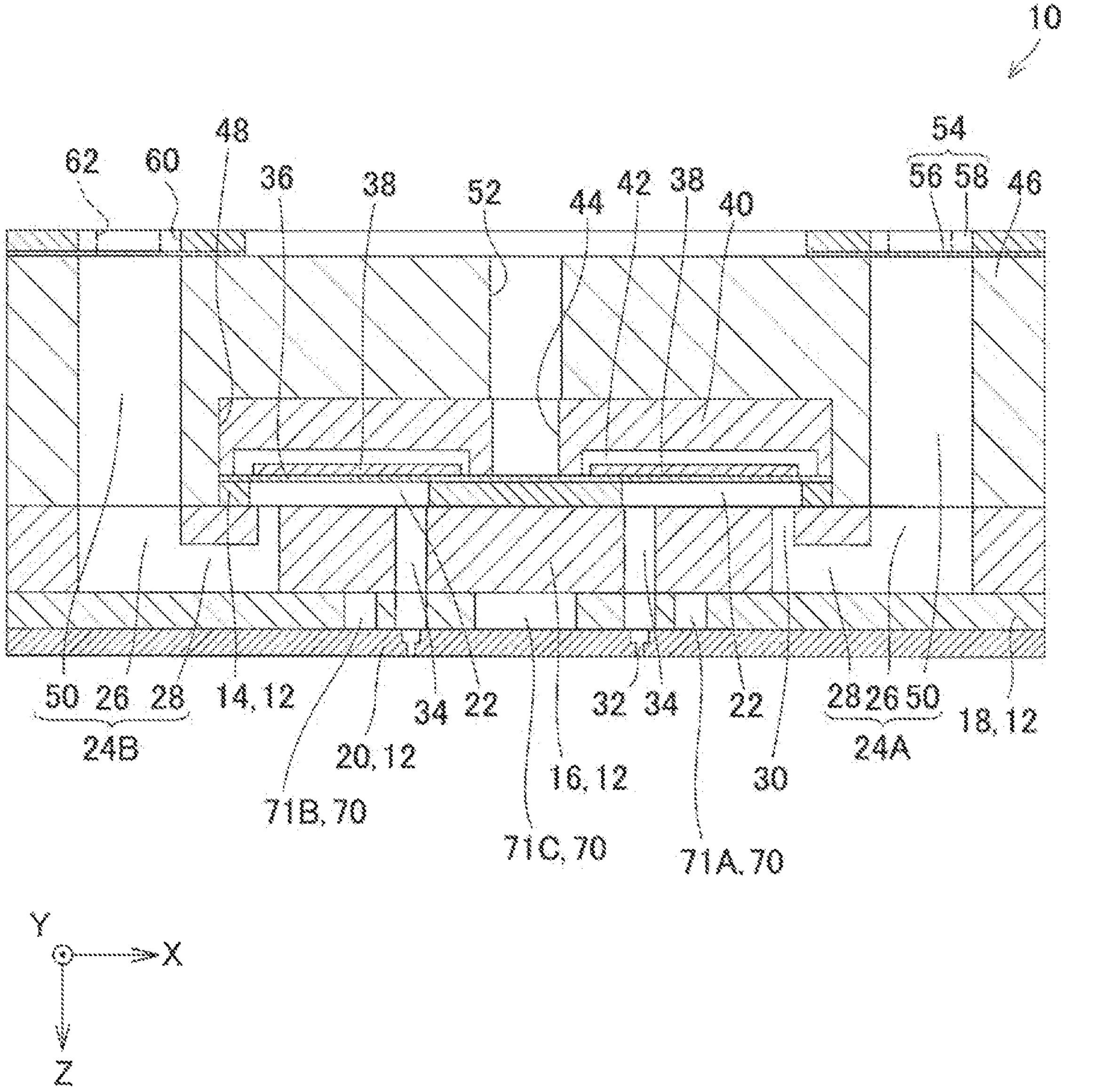
FIG. 3 is a sectional view of the recording head according to the first embodiment of the present disclosure.
Figure 4:
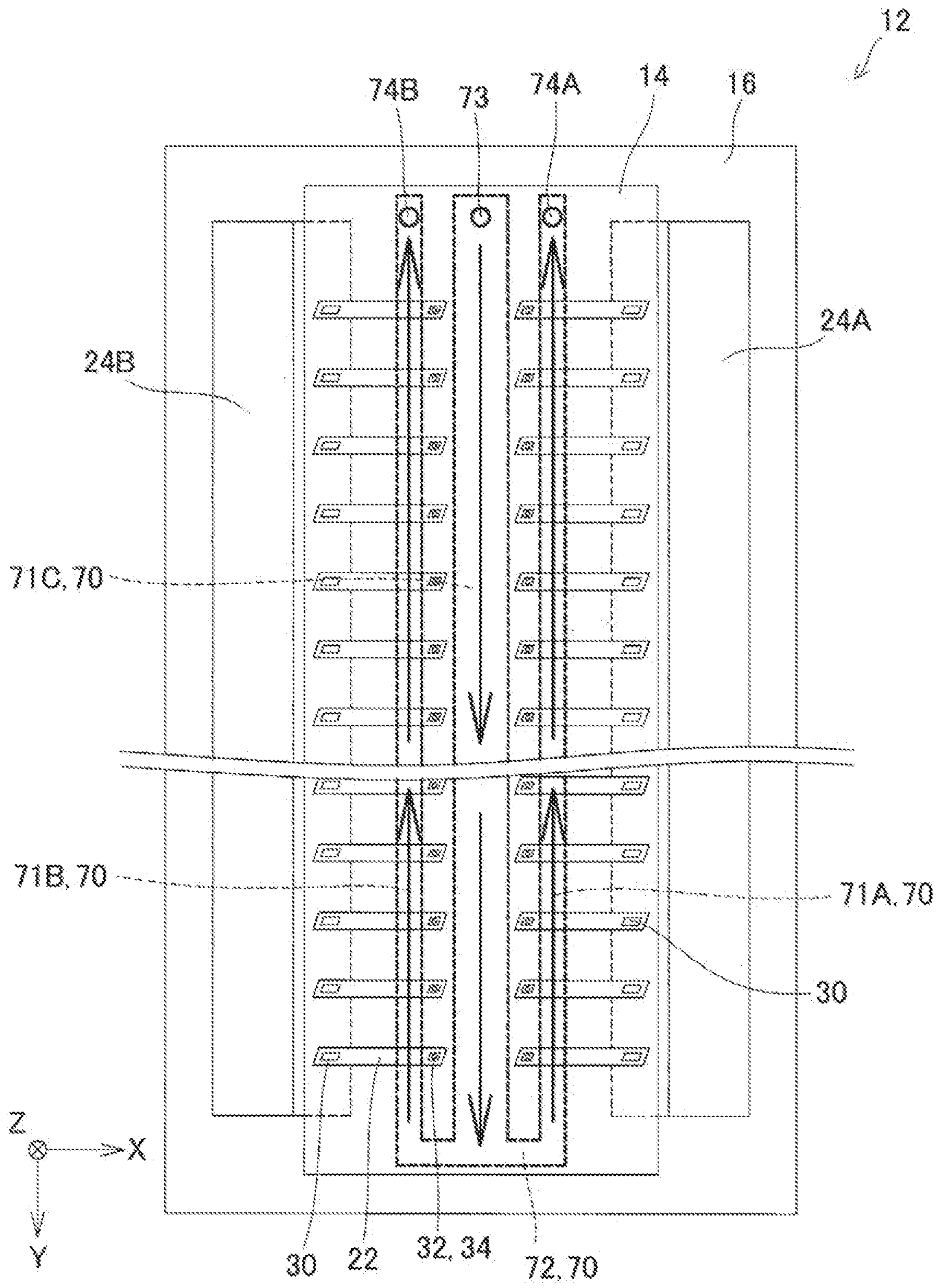
FIG. 4 is a plan view of a passage formation substrate according to the first embodiment of the present disclosure.

Next, the configuration of the recording head 10 will be described. FIG. 2 is an exploded perspective view illustrating main constituents of the recording head according to the first embodiment of the present disclosure. FIG. 3 is a sectional view of the recording head in the X-axis direction. FIG. 4 is a plan view of a passage formation substrate viewed in the +Z direction.

The recording head 10 according to the present embodiment illustrated in FIGS. 2 to 4 ejects ink, which is the first liquid, in the Z-axis direction, more specifically, in the +Z direction.

The recording head 10 includes a passage formation substrate 12 in which an ink passage, which is a liquid passage, is formed. The passage formation substrate 12 is configured with a plurality of substrates stacked in a plate thickness direction. The ink passage is a passage through which ink, which is the first liquid, flows and extends from a manifold, which is a common liquid chamber described later, to a nozzle.

In the present embodiment, the passage formation substrate 12 is formed of a pressure chamber substrate 14, a manifold substrate 16, a communication plate 18, and a nozzle plate 20 that are stacked. In the present embodiment, each of the substrates that constitute the passage formation substrate 12 is formed of a single crystal silicon substrate. However, the material of each substrate that constitutes the passage formation substrate 12 is not particularly limited, and may be, for example, other silicon substrates such as a polycrystal silicon substrate, a silicon on insulator (SOI) substrate, a glass substrate, various types of ceramic substrates, and the like.

In the pressure chamber substrate 14, a plurality of pressure chambers 22 constituting the ink passage are disposed in two lines in the X-axis direction. That is, the plurality of pressure chambers 22 constituting each line are disposed in the Y-axis direction. The plurality of pressure chambers 22 constituting each line are disposed in a straight line extending in the Y-axis direction such that the positions of the pressure chambers 22 in the X-axis direction are the same. The pressure chambers 22 adjacent to each other in the Y-axis direction are divided by a partition wall. Needless to say, the disposition of the pressure chambers 22 is not particularly limited. For example, the plurality of pressure chambers 22 arranged in the Y-axis direction may be disposed in a so-called zigzag pattern in which the pressure chambers 22 are alternately displaced in the X-axis direction.

The manifold substrate 16 is stacked on the +Z direction side of the pressure chamber substrate 14. The manifold substrate 16 is provided with a manifold 24A and a manifold 24B, each of which is a common liquid chamber common to the plurality of pressure chambers 22 of corresponding one of the two lines. Each of the manifolds 24A and 24B includes a first manifold portion 26 and a second manifold portion 28.

The first manifold portion 26 is provided so as to pass through the manifold substrate 16 in a thickness direction, and the second manifold portion 28 is provided on the pressure chamber 22 side of the first manifold portion 26 without passing through the manifold substrate 16 and opens in a surface opposite to the pressure chamber substrate 14. In addition, the manifold substrate 16 is provided with a supply communication hole 30 that enables the second manifold portion 28 to be in communication with each pressure chamber 22 disposed in line.

In addition, on the +Z direction side of the manifold substrate 16, the communication plate 18 and the nozzle plate 20 are stacked. One surface side of each of the manifolds 24A and 24B is sealed by the communication plate 18.

In the nozzle plate 20, a nozzle 32 in communication with each pressure chamber 22 is formed. In the present embodiment, a plurality of nozzles 32 are provided in two nozzle lines 33A and 33B, each of which is disposed so as to be one line in the Y-axis direction and to be apart from each other in the X-axis direction.

In the manifold substrate 16 and the communication plate 18, a nozzle communication hole 34 that enables each nozzle 32 formed in the nozzle plate 20 to be in communication with the pressure chamber 22 formed in the pressure chamber substrate 14 is provided so as to pass through the manifold substrate 16 and the communication plate 18 in a thickness direction.

In this manner, the passage formation substrate 12 is configured with the pressure chamber substrate 14, the manifold substrate 16, the communication plate 18, and the nozzle plate 20 that are stacked. In the passage formation substrate 12, an ink passage including the manifolds 24A and 24B that are common liquid chambers, the supply communication hole 30, the pressure chamber 22, the nozzle communication hole 34, and the nozzle 32 is formed.

On the surface of the passage formation substrate 12 on the −Z direction side, that is, on the surface of the pressure chamber substrate 14 on the −Z direction side, a piezoelectric actuator 38 serving as a pressure generation element is provided with a vibration plate 36 therebetween. The piezoelectric actuator 38 is provided correspondingly to each pressure chamber 22. In the recording head 10, the vibration plate 36 is driven by the piezoelectric actuator 38 and is bent and deformed, and a pressure change is generated in the ink in the pressure chamber 22 by the deformation of the vibration plate 36, thereby causing the ink to be ejected from the nozzle 32. Note that the configurations of the vibration plate 36 and the piezoelectric actuator 38 are not particularly limited, and a known configuration may be adopted, and thus a detailed description will be omitted.

The surface of the pressure chamber substrate 14 on the −Z direction side is further joined by an adhesive or the like to a protection substrate 40 having substantially the same size as the pressure chamber substrate 14. In the protection substrate 40, a holding portion 42 that holds a plurality of piezoelectric actuators 38 is formed. In addition, in the protection substrate, a through hole 44 is provided between the lines of holding portions 42 and passes through the protection substrate 40 in the Z-axis direction.

In addition, on the protection substrate 40, a case member 46 is further fixed. The case member 46 has substantially the same shape as the manifold substrate 16 in plan view, is joined to the protection substrate 40, and is also joined to the manifold substrate 16.

The case member 46 is provided with an accommodating portion 48 that is a cavity deep enough to accommodate the pressure chamber substrate 14 and the protection substrate 40 and that opens in the surface on the protection substrate 40 side. The accommodating portion 48 has an opening area that is slightly larger than the surface of the protection substrate 40 joined to the passage formation substrate 12. In addition, while the accommodating portion 48 accommodates the passage formation substrate 12 and the protection substrate 40, the opening surface of the accommodating portion 48 on the nozzle plate 20 side is sealed by the manifold substrate 16.

In addition, in the case member 46, on each outer side of the accommodating portion 48 in the X-axis direction, a third manifold portion 50 is formed. The third manifold portion 50 is provided so as to pass through the case member 46 in the Z-axis direction and is in communication with the first manifold portion 26 provided in the manifold substrate 16. In addition, the manifolds 24A and 24B are configured with the first manifold portion 26, the second manifold portion 28, and the third manifold portion 50.

Moreover, the case member 46 is provided with a coupling port 52 in communication with the through hole 44 of the protection substrate 40. Although not illustrated, a lead electrode drawn from each piezoelectric actuator 38 is extended into the through hole 44, and the lead electrode is coupled to exterior wiring inserted from the coupling port 52 into the through hole 44.

Note that on a surface of the case member 46 on one direction side, a compliance substrate 54 is joined, and the third manifold portion 50 is sealed by the compliance substrate 54. The compliance substrate 54 includes, for example, a sealing film 56 made of a flexible thin film and a fixing substrate 58 made of a hard material such as metal. A region of the fixing substrate 58 facing the third manifold portion 50 is an opening portion 60. In addition, the compliance substrate 54 is provided with an introduction port 62 that is in communication with each third manifold portion 50 and supplies ink to corresponding one of the manifolds 24A and 24B. The introduction port 62 is coupled to an ink tank 2, which is an ink supply unit.

In the recording head 10 having such a configuration, ink is taken from the ink tank 2 through the introduction port 62, and the ink passage from the manifold 24A or 24B to each nozzle 32 is filled with the ink. Thereafter, according to a recording signal from a driving circuit, a voltage is applied to each piezoelectric actuator 38 corresponding to the pressure chamber 22, the vibration plate 36 is bent and deformed together with the piezoelectric actuator 38, the pressure inside each pressure chamber 22 increases, and then ink drops are ejected from each nozzle 32.

In the passage formation substrate 12 constituting the recording head 10 according to the present embodiment, the circulation passage 70 is formed, passes near each nozzle 32 and is not in communication with the ink passage through which ink as the first liquid flows, and a cooling liquid as the second liquid circulates through the circulation passage 70. Note that the type of the cooling liquid is not particularly limited, but in the present embodiment, water (cooling water) is used as the cooling liquid.

The circulation passage 70 is provided so as to pass through the communication plate 18 in a thickness direction and is disposed in close contact with the nozzle communication hole 34 that enables the nozzle 32 to be in communication with the pressure chamber 22. One surface side of the circulation passage 70 is formed of the manifold substrate 16 joined to the communication plate 18, and another surface side is formed of the nozzle plate 20 joined to the communication plate 18.

In addition, the circulation passage 70 includes a plurality of extending portions 71. In the present embodiment, the circulation passage 70 has a first extending portion 71A, a second extending portion 71B, and a third extending portion 71C, which are the plurality of extending portions 71. In addition, the circulation passage 70 has a coupling portion 72 that couples the extending portions 71 (71A, 71B, and 71C).

The extending portions 71 are provided in the Y-axis direction, which is a first direction, and extend over a region where a plurality of nozzles 32 are formed. Note that the extending portions 71 do not necessarily have to be provided in parallel to the nozzle lines 33A and 33B, and may be provided in a direction slightly with the extending direction of the nozzle lines 33A and 33B.

In addition, each of the extending portions 71 is provided on corresponding one of sides of the nozzles 32 in the X-axis direction, which is a second direction. The first extending portion 71A is provided outside the nozzle line 33A in the X-axis direction, that is, on the +X direction side, and the second extending portion 71B is provided outside the nozzle line 33B in the X-axis direction, that is, on the −X direction side. In addition, the third extending portion 71C is provided between the first nozzle line 33A and the second nozzle line 33B in the X-axis direction. In other words, the first extending portion 71A and the second extending portion 71B are provided in a region facing the pressure chamber 22 in the Z-axis direction, and the third extending portion 71C is provided in a region facing the through hole 44 into which the exterior wiring is inserted in the Z-axis direction.

The coupling portion 72 is provided outside a region where the nozzles 32 are formed in the Y-axis direction and couples the extending portions 71 adjacent to each other. In the present embodiment, the coupling portion 72 is provided so as to extend in the X-axis direction in a region on the +Y direction side of the nozzles 32, couples one end portion of the first extending portion 71A and one end portion of the third extending portions 71C adjacent to each other and also couples one end portion of the second extending portion 71B and one end portion of the third extending portion 71C. That is, the third extending portion 71C is coupled to each of the first extending portion 71A and the second extending portion 71B. Therefore, the passage area of the third extending portion 71C is larger than the passage areas of the first extending portion 71A and the second extending portion 71B.

In addition, in the recording head 10, an inflow hole 73 that is in communication with the circulation passage 70 and into which the cooling liquid flows, and a discharge hole 74 through which the cooling liquid is discharged from the circulation passage 70 are provided. The inflow hole 73 and the discharge hole 74 are provided in a region on the −Y direction side with respect to the region where the nozzles 32 are formed.

In the present embodiment, one inflow hole 73 corresponding to the third extending portion 71C and two discharge holes 74 (74A and 74B) corresponding to the first extending portion 71A and the second extending portion 71B are provided. That is, the inflow hole 73 is coupled to a portion near another end portion of the third extending portion 71C, the discharge hole 74A is coupled to a portion near another end portion of the first extending portion 71A, and the discharge hole 74B is coupled to a portion near another end portion of the second extending portion 71B.

In addition, the inflow hole 73 is coupled to the liquid delivery apparatus 80 included in the recording apparatus 1 (see FIG. 1). The liquid delivery apparatus 80 includes a liquid storage 81 that stores the cooling liquid, and the liquid storage 81 is coupled to the inflow hole 73 by a liquid delivery tube 82.

In the middle of the liquid delivery tube 82, a liquid delivery pump 83 is provided, and the liquid in the liquid storage 81 is sent to the inflow hole 73 by the liquid delivery pump 83. In addition, the liquid storage 81 is coupled to the discharge holes 74A and 74B by a liquid discharge tube 84. In the middle of the liquid discharge tube 84, a liquid discharge pump 85 is provided, and the liquid discharged from the discharge holes 74A and 74B is sent to the liquid storage 81 by the liquid discharge pump 85. Note that the liquid delivery apparatus 80 does not necessarily have to include both of the liquid delivery pump 83 and the liquid discharge pump 85 and may include only one of the liquid delivery pump 83 and the liquid discharge pump 85 where necessary.

In addition, in the liquid storage 81, a temperature adjustment apparatus 86 is included for adjusting the temperature of the cooling water stored in the liquid storage 81, that is, for cooling the cooling water to a prescribed temperature. Although not illustrated, the temperature adjustment apparatus 86 includes a temperature sensor that detects the temperature of the cooling water in the liquid storage 81, a cooling mechanism that decreases the temperature inside the liquid storage 81, a control device that drives, based on the temperature detected by the temperature sensor, the cooling mechanism so that the cooling water in the liquid storage 81 attains the desired temperature, and the like.

In addition, the liquid delivery apparatus 80 supplies the cooling water whose temperature is adjusted to the prescribed temperature in the liquid storage 81 to the inflow hole 73 through the liquid delivery tube 82. The cooling water that has flowed into the circulation passage 70 from the inflow hole 73 by the liquid delivery apparatus 80 flows, as indicated by the arrows in FIG. 4, in the +Y direction through the third extending portion 71C and flows in the −Y direction through the first extending portion 71A and the second extending portion 71B through the coupling portion 72. Thereafter, the cooling water is discharged outside from the circulation passage 70 through the discharge holes 74A and 74B.

Note that the sectional area of the circulation passage 70 should be appropriately determined, but it is preferable that the total sectional area of circulation passages, which are two branched passages of the circulation passage 70, where the discharge holes 74A and 74B exist, is equal to the sectional area where the inflow hole 73 exists before the circulation passage 70 branches. For example, in the configuration of FIG. 4, it is preferable that the passage area of the third extending portion 71C is equal to the total of the passage areas of the first extending portion 71A and the second extending portion 71B. As a result, the passage conductance equalizes, and the cooling water easily and smoothly flows before and after the circulation passage 70 branches.

Note that the control device may be separated from or shared with the control unit 3. In addition, the temperature adjustment apparatus 86 may be provided at an appropriate position between the liquid storage 81 and the recording head 10, instead of being provided in the liquid storage 81.

As described above, the recording head 10, which is the liquid ejecting head, according to the present disclosure includes each nozzle 32 that is in communication with the pressure chamber 22 and ejects ink, which is the first liquid, the passage formation substrate 12 that has, as the liquid passage, the ink passage which extends from the manifold 24, which is the common liquid chamber, in communication with the plurality of pressure chambers 22 to the nozzle 32 and through which ink flows, and the circulation passage 70 that is formed in the passage formation substrate 12, passes near the nozzle 32, and is not in communication with the ink passage, and through which the cooling water, which is the second liquid, circulates.

As a result, the temperature of the ink in the ink passage in a portion near the nozzle 32 can be maintained at a desired temperature. As a result, for example, the viscosity of the ink near the nozzle 32 can be maintained to be appropriate, and in addition, evaporation of moisture in the ink in the nozzle 32 can be suppressed. Therefore, a change in the ejecting speed of ink drops and the like can be suppressed, and the ejecting property can be stabilized. In addition, by locally controlling the ink temperature in a portion near the nozzle 32, temperature control can be easily performed, and energy consumption for temperature control can also be suppressed.

In addition, in the passage formation substrate 12, a plurality of nozzles 32 are disposed in line in the Y-axis direction, which is the first direction, and the circulation passage 70 has the extending portions 71 that are provided in the Y-axis direction and extend over the region where the plurality of nozzles 32 are formed. That is, the circulation passage 70 is provided over the region where the plurality of nozzles 32 are formed in the Y-axis direction. As a result, near all the nozzles 32 that are disposed in line, the ink temperature can be easily made uniform.

In addition, the circulation passage 70 has a plurality of extending portions 71, the adjacent extending portions 71 are coupled to each other on one end side in the Y-axis direction, and cooling water, which is the second liquid, circulates in opposite directions in the adjacent extending portions 71. Specifically, the cooling water flows in the −Y direction in the first extending portion 71A and the second extending portion 71B, and the cooling water flows in the +Y direction in the third extending portion 71C. That is, the circulation passage 70 is provided such that the cooling water is circulated in the Y-axis direction.

As a result, in the Y-axis direction, which is the line direction of the nozzles 32, the temperature of the ink near the nozzles 32 is easily made uniform. Although a variation is caused in the temperature of the cooling water between one end side and another end side of each extending portion 71 in the Y-axis direction in some cases, by circulating the cooling water in the Y-axis direction, a variation in the total temperature of the cooling water can be suppressed.

In addition, the extending portion 71 is provided on each side of the nozzles 32 in the X-axis direction, which is the second direction orthogonal to the Y-axis direction. In the present embodiment, the first extending portion 71A is provided outside the nozzle line 33A in the X-axis direction, the second extending portion 71B is provided outside the nozzle line 33B in the X-axis direction, and the third extending portion 71C is provided between the nozzle line 33A and the nozzle line 33B in the X-axis direction. As a result, temperature control of the ink near the nozzles 32 can be easily performed.

Second Embodiment

Figure 5:
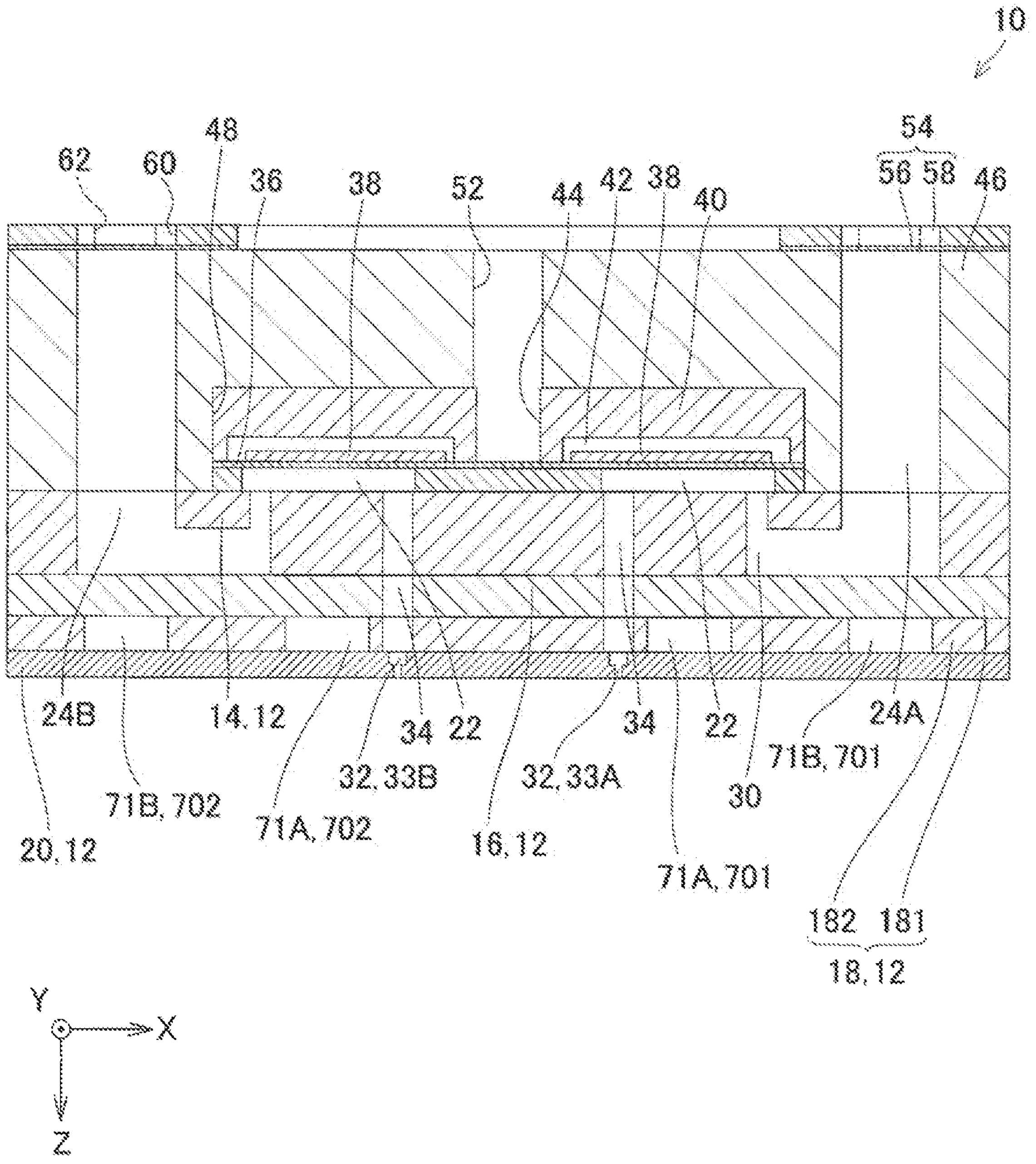
FIG. 5 is sectional view of a recording head according to a second embodiment of the present disclosure.
Figure 6:
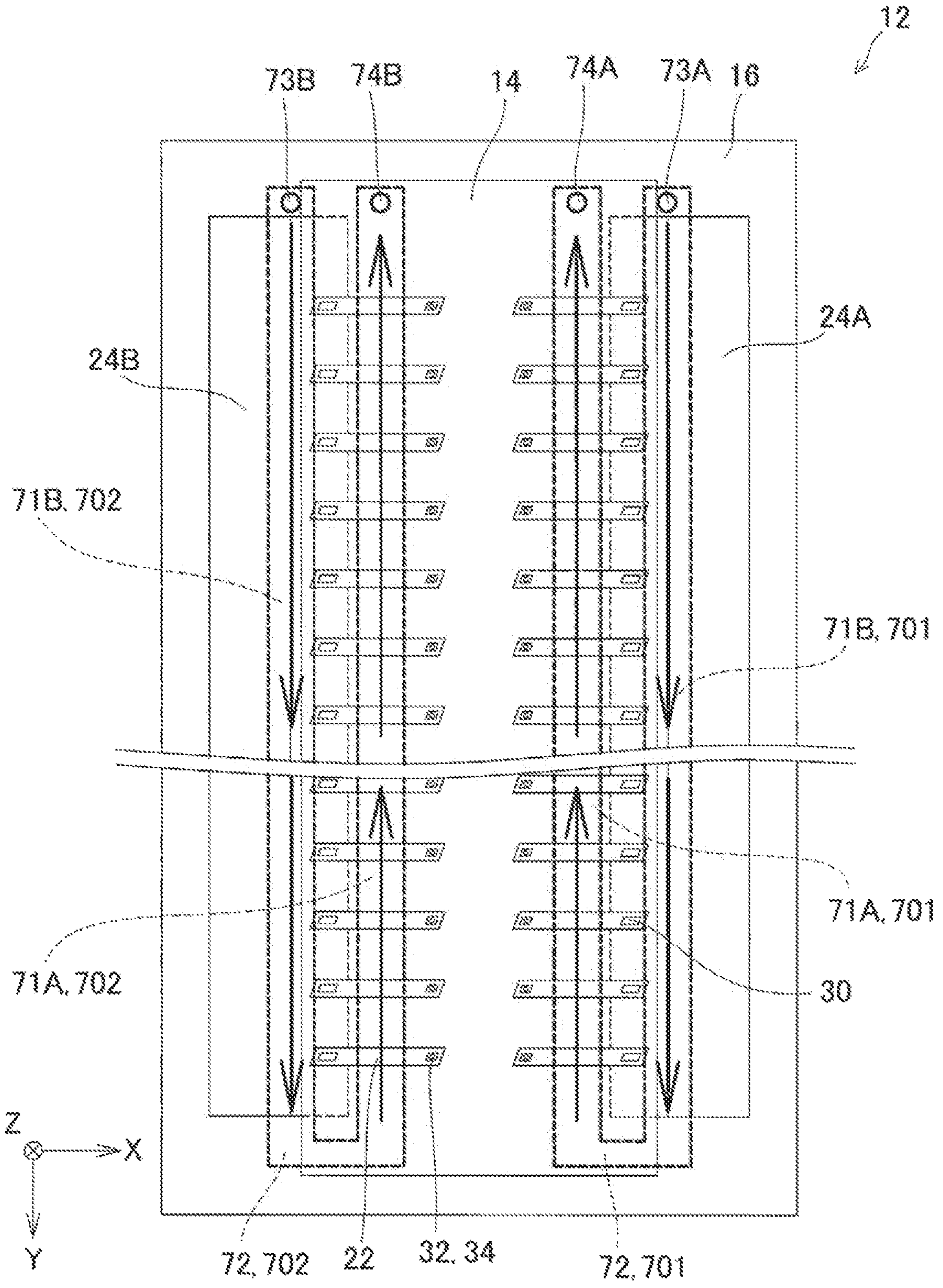
FIG. 6 is a plan view of a passage formation substrate according to the second embodiment of the present disclosure.
Figure 7:
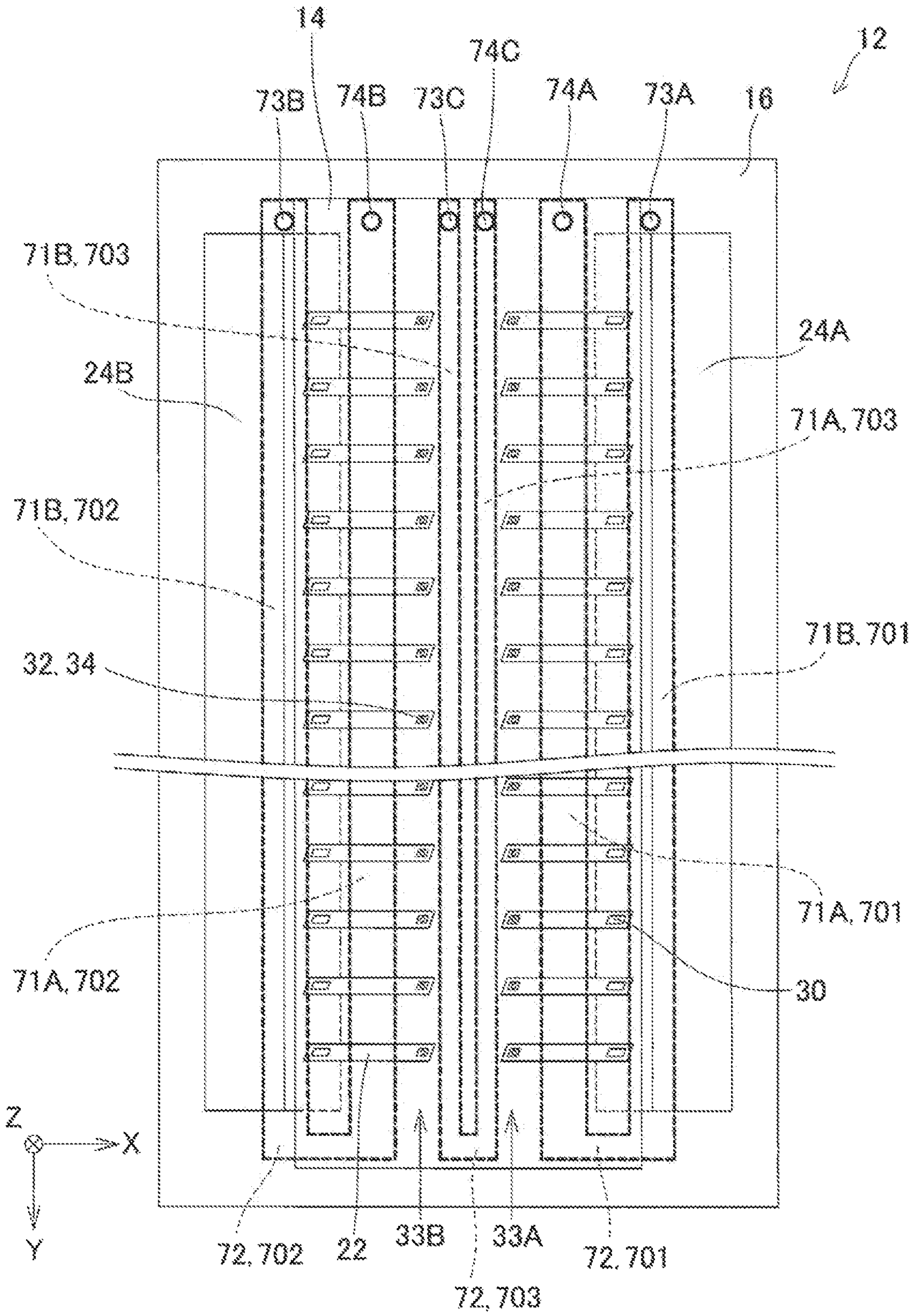
FIG. 7 is a plan view illustrating a modification of the passage formation substrate according to the second embodiment of the present disclosure.

FIG. 5 is a sectional view of a recording head according to a second embodiment, and FIG. 6 is a plan view of a passage formation substrate according to the second embodiment viewed in the +Z direction. FIG. 7 is a modification of the passage formation substrate according to the second embodiment and is a plan view of the passage formation substrate viewed in the +Z direction. Note that the same members in the figures will be denoted by the same reference signs, and descriptions that overlap the above-described embodiment will be omitted.

The present embodiment is a modification of the circulation passage 70 formed in the passage formation substrate 12, and the configurations other than the passage formation substrate 12 is the same as the first embodiment.

As illustrated in FIGS. 5 and 6, in the same manner as the first embodiment, the passage formation substrate 12 according to the present embodiment includes the pressure chamber substrate 14, the manifold substrate 16, the communication plate 18, and the nozzle plate 20, but the communication plate 18 is configured with two stacked substrates. That is, the communication plate 18 is configured with a first communication plate 181 joined to the manifold substrate 16 and a second communication plate 182 joined on the nozzle plate 20 side of the first communication plate 181.

In addition, the circulation passage 70 according to the present embodiment is provided so as to pass through the second communication plate 182. Moreover, in the passage formation substrate 12, two independent circulation passages 70 are formed. In the passage formation substrate 12, a first circulation passage 701 corresponding to the nozzle line 33A and a second circulation passage 702 corresponding to the nozzle line 33B are formed so as not to be in communication with each other.

In addition, the first circulation passage 701 and the second circulation passage 702 each include two extending portions 71, that is, the first extending portion 71A and the second extending portion 71B. In the present embodiment, the first extending portion 71A is provided in a region facing the pressure chamber 22 in the Z-axis direction, and the second extending portion 71B is provided in a region facing the manifolds 24A and 24B. The first extending portion 71A and the second extending portion 71B are coupled by the coupling portion 72 outside the region where the nozzles 32 are formed in the Y-axis direction.

In addition, in the present embodiment, inflow holes 73A and 73B and discharge holes 74A and 74B are provided correspondingly to the first circulation passage 701 and the second circulation passage 702, respectively. Each of the inflow holes 73A and 73B is coupled to a portion near an end portion of the second extending portion 71B on a side opposite to the coupling portion 72, and each of the discharge holes 74A and 74B is coupled to a portion near an end portion of the first extending portion 71A on a side opposite to the coupling portion 72.

Therefore, as indicated by the arrows in FIG. 6, the cooling water that has flowed into the first circulation passage 701 and the second circulation passage 702 from the inflow holes 73A and 73B flows through the second extending portion 71B in the +Y direction and flows through the first extending portion 71A in the −Y direction through the coupling portion 72. Thereafter, the cooling water is discharged outside form the first circulation passage 701 and the second circulation passage 702 through the discharge holes 74A and 74B.

Even with the above-described configuration of the present embodiment, the same effects as the first embodiment can be obtained. In addition, in the present embodiment, the second extending portion 71B constituting the first circulation passage 701 and the second circulation passage 702 extends in the region facing the pressure chamber 22 and the manifolds 24A and 24B that are common liquid chambers, in the Z-axis direction that is a thickness direction of the passage formation substrate 12. That is, the circulation passage 70 is provided in a position overlapping the pressure chamber 22 and the manifolds 24A and 24B in the Z-axis direction. Therefore, even in a portion, of the ink passage, other than the portion near the nozzles 32, the ink temperature can be easily controlled. As a result, the temperature of the ink near the nozzles 32 can be more easily controlled.

Note that in the present embodiment, a configuration in which the first circulation passage 701 and the second circulation passage 702 are provided only at positions where the first circulation passage 701 and the second circulation passage 702 overlap the pressure chamber 22 and the manifolds 24A and 24B in the Z-axis direction is exemplified, but the circulation passage 70 may be provided in other regions of the passage formation substrate 12.

For example, as illustrated in FIG. 7, in addition to the first circulation passage 701 and the second circulation passage 702, a third circulation passage 703 may be provided in a region between the nozzle line 33A and the nozzle line 33B in the X-axis direction. Note that the third circulation passage 703 is formed into a U-shape similarly to the first circulation passage 701 and the second circulation passage 702. That is, the third circulation passage 703 is configured with the first extending portion 71A, the second extending portion 71B, and the coupling portion 72 that couples the first extending portion 71A to the second extending portion 71B. In addition, an inflow hole 73C is coupled to the first extending portion 71A (of the third circulation passage 703), and a discharge hole 74C is coupled to the second extending portion 71B (of the third circulation passage 703). In this manner, by providing the third circulation passage 703 in addition to the first circulation passage 701 and the second circulation passage 702, the temperature of the ink near the nozzles 32 is more easily controlled.

Third Embodiment

Figure 8:
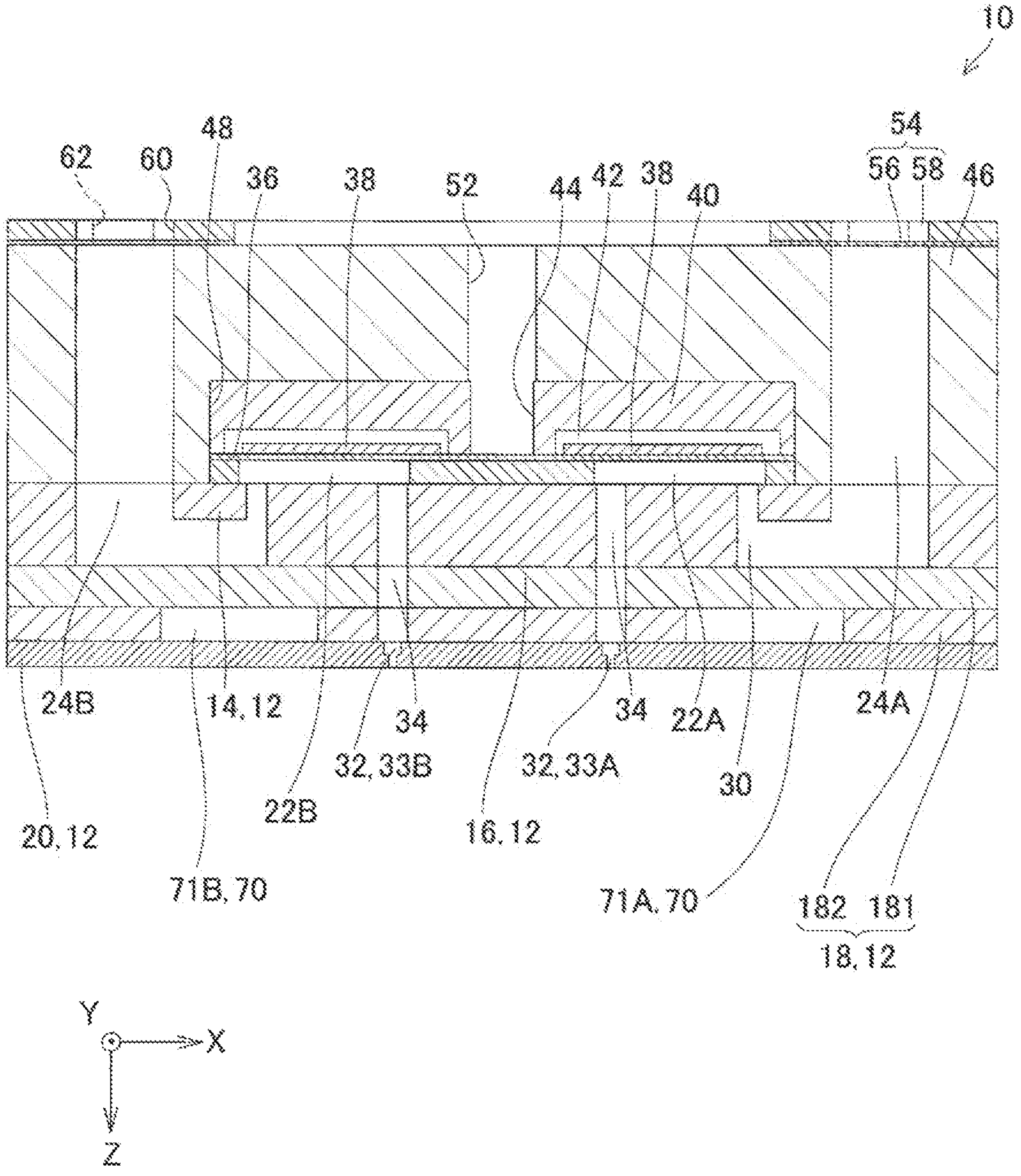
FIG. 8 is a sectional view of a recording head according to a third embodiment of the present disclosure.
Figure 9:
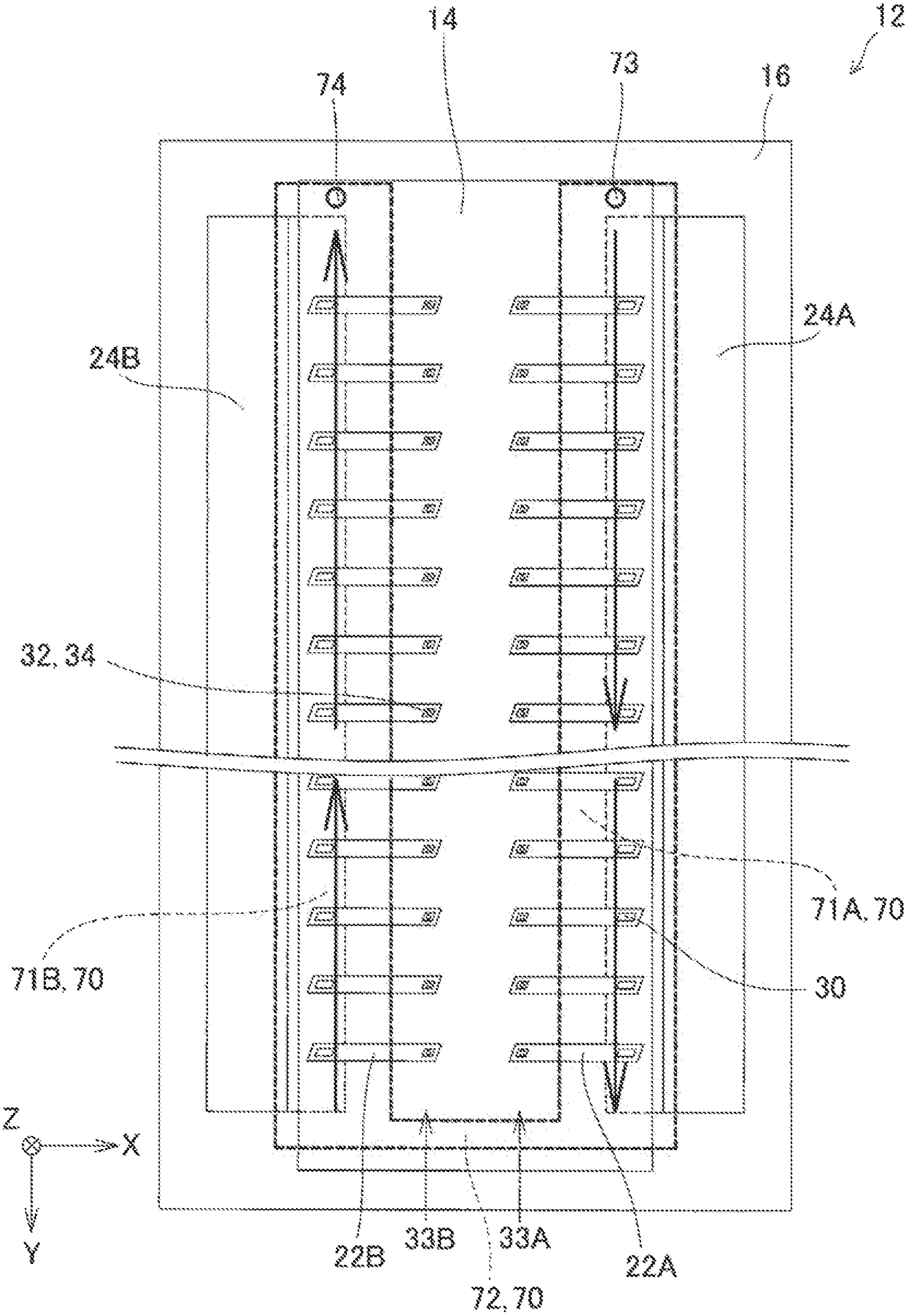
FIG. 9 is a plan view of a passage formation substrate according to the third embodiment of the present disclosure.

FIG. 8 is a sectional view of a recording head according to a third embodiment, and FIG. 9 is a plan view of a passage formation substrate according to the third embodiment viewed in the +Z direction. Note that the same members in the figures will be denoted by the same reference signs, and descriptions that overlap the above-described embodiments will be omitted.

The present embodiment is a modification of the circulation passage 70 formed in the passage formation substrate 12, and the configurations other than the passage formation substrate 12 are the same as the second embodiment.

As illustrated in FIGS. 8 and 9, in the same manner as the second embodiment, the passage formation substrate 12 according to the present embodiment includes the pressure chamber substrate 14, the manifold substrate 16, the communication plate 18, and the nozzle plate 20, and the communication plate 18 is configured with the first communication plate 181 and the second communication plate 182. In addition, the circulation passage 70 is provided so as to pass through the second communication plate 182.

The circulation passage 70 according to the present embodiment includes two extending portions 71, that is, the first extending portion 71A and the second extending portion 71B. Each of the first extending portion 71A and the second extending portion 71B is provided in a region facing the corresponding pressure chamber 22 and the corresponding manifold 24 in the Z-axis direction. More specifically, the first extending portion 71A is provided so as to overlap pressure chambers 22A and the manifold 24A corresponding to the nozzle line 33A in the Z-axis direction, and the second extending portion 71B is provided correspondingly to pressure chambers 22B and the manifold 24B corresponding to the nozzle line 33B.

That is, the first extending portion 71A has a width that reaches a region facing the manifold 24A from a region facing the pressure chamber 22A in the X-axis direction and is extended in the Y-axis direction at a substantially constant width. Similarly, the second extending portion 71B has a width that reaches the manifold 24B from a region facing the pressure chamber 22B in the X-axis direction and is extended in the Y-axis direction at a substantially constant width.

In addition, the first extending portion 71A and the second extending portion 71B are coupled by the coupling portion 72 outside the region where the nozzles 32 are formed in the Y-axis direction.

In addition, in the present embodiment, the inflow hole 73 is coupled to a portion near an end portion of the first extending portion 71A on a side opposite to the coupling portion 72, and the discharge hole 74 is coupled to a portion near an end portion of the second extending portion 71B on a side opposite to the coupling portion 72. Therefore, as indicated by the arrows in FIG. 9, the cooling water that has flowed into the circulation passage 70 from the inflow hole 73 flows through the first extending portion 71A in the +Y direction, flows into the second extending portion 71B through the coupling portion 72, and flows in the −Y direction. Thereafter, the cooling water is discharged outside from the first circulation passage 701 and the second circulation passage 702 through the discharge hole 74.

Even in such a configuration of the present disclosure, the circulation passage 70 is provided at a position where the circulation passage 70 overlaps the pressure chamber 22A and 22B and manifolds 24A and 24B in the Z-axis direction. Therefore, in the same manner as the second embodiment, the temperature of ink can be easily controlled in a portion, of the ink passage, other than a portion near the nozzles 32. As a result, the temperature of the ink near the nozzles 32 can be more easily controlled.

Fourth Embodiment

Figure 10:
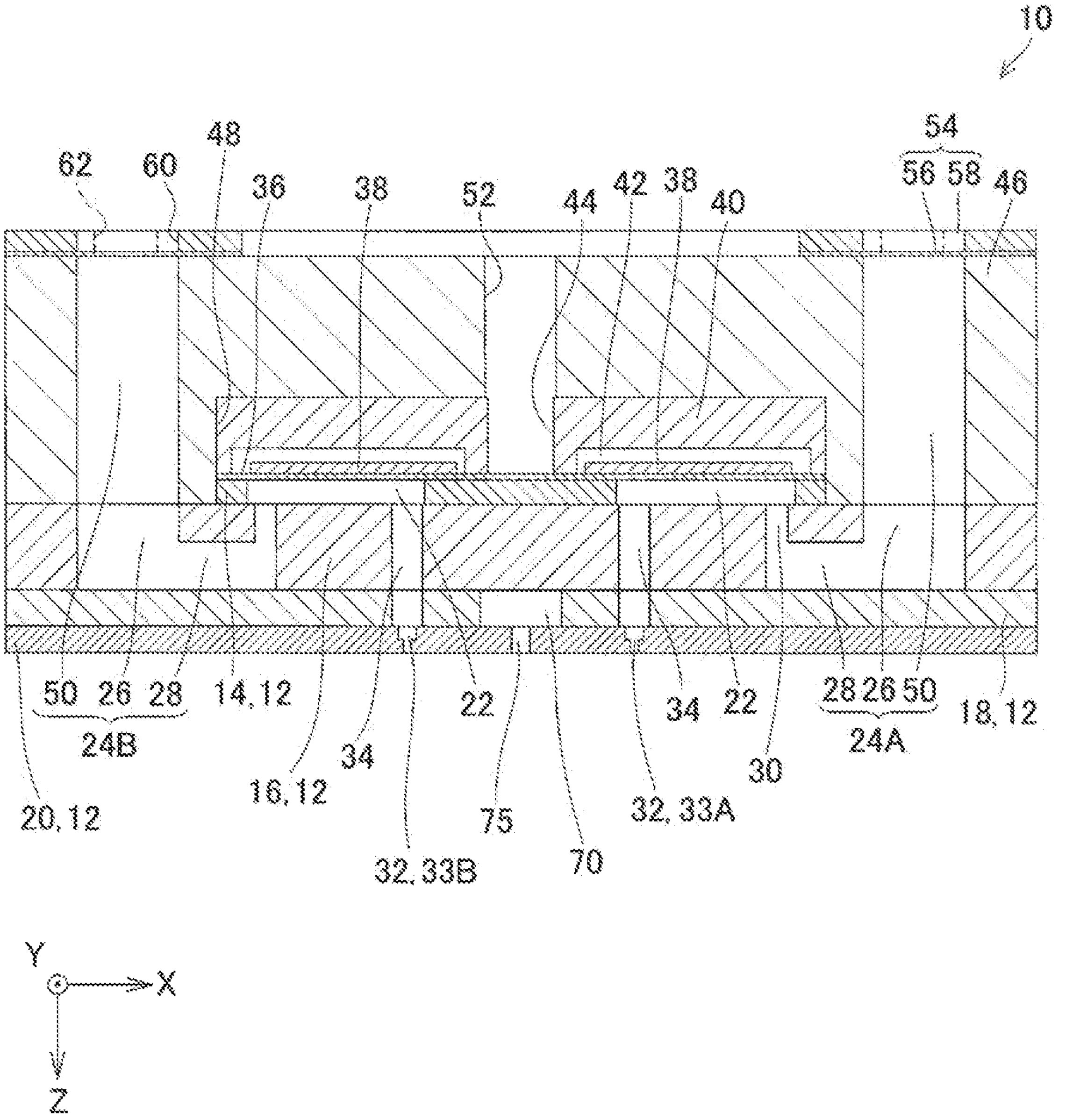
FIG. 10 is a sectional view of a recording head according to a fourth embodiment of the present disclosure.
Figure 11:
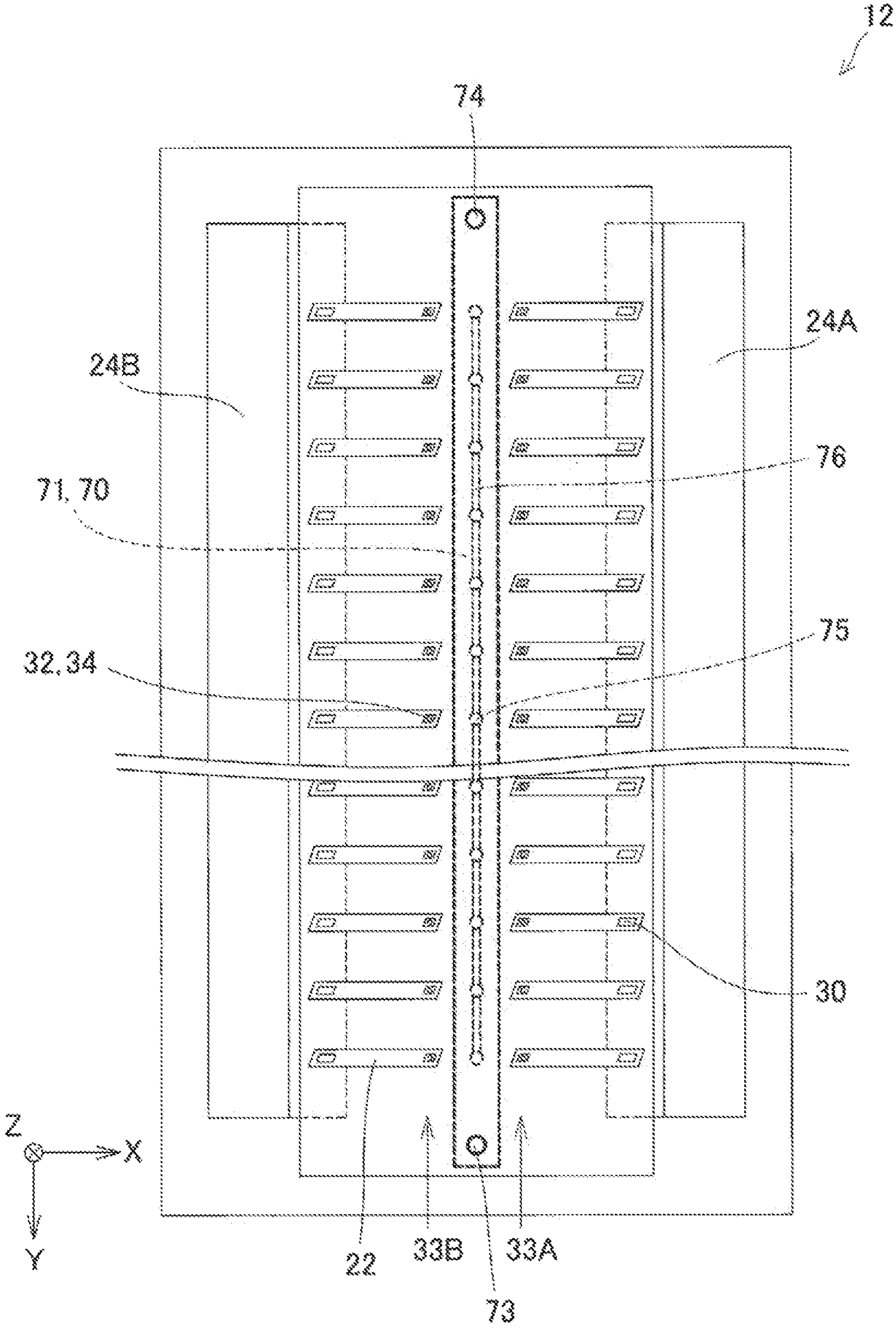
FIG. 11 is a plan view of a passage formation substrate according to the fourth embodiment of the present embodiment.
Figure 12:
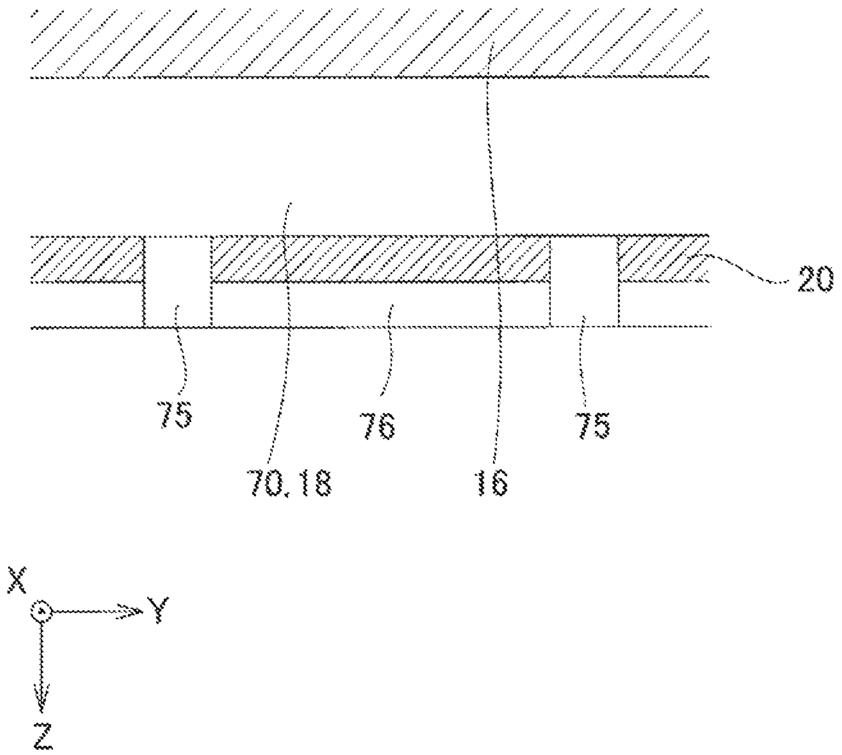
FIG. 12 is sectional view explaining a recess according to the fourth embodiment of the present disclosure.
Figure 13:
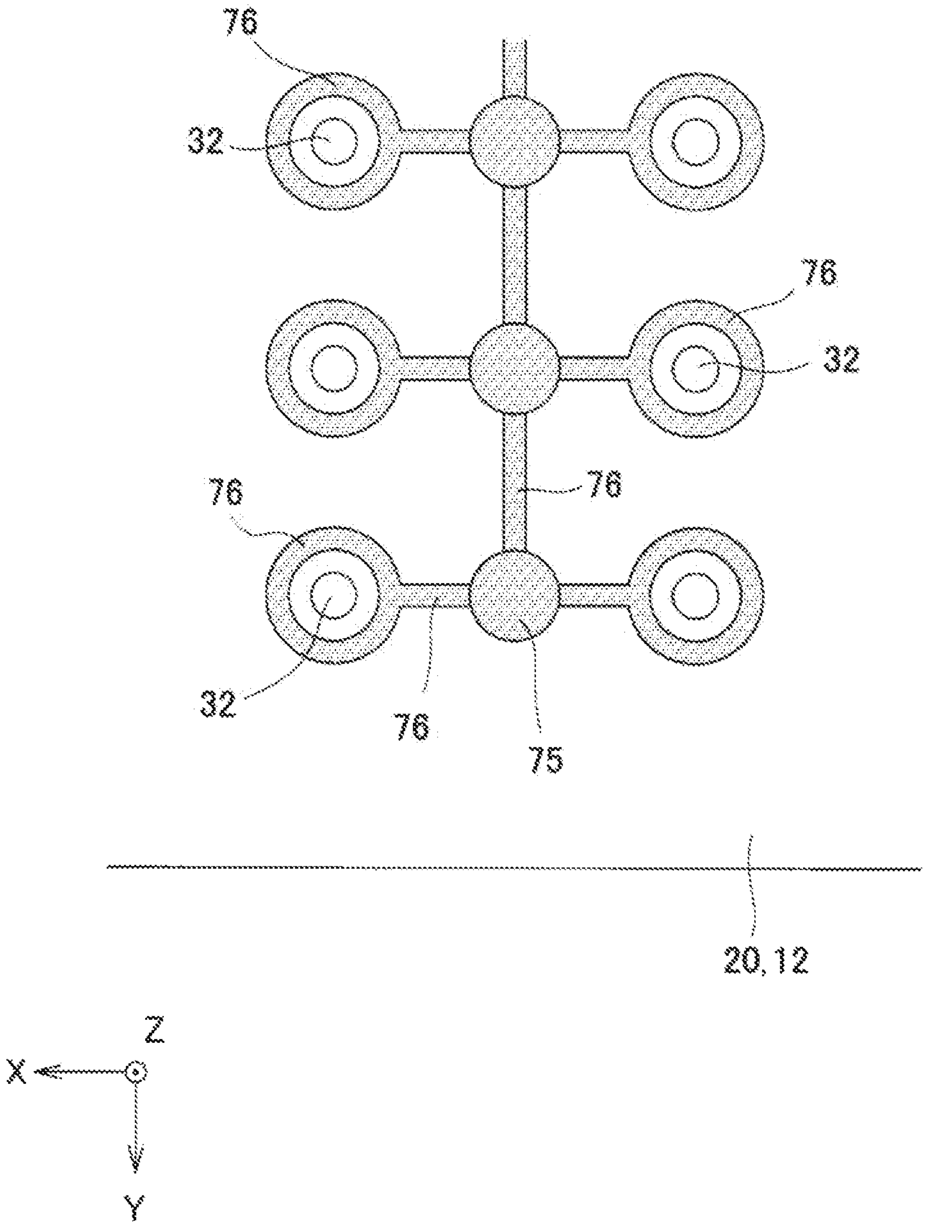
FIG. 13 is a plan view explaining a modification of the recess according to the fourth embodiment of the present disclosure.
Figure 14:
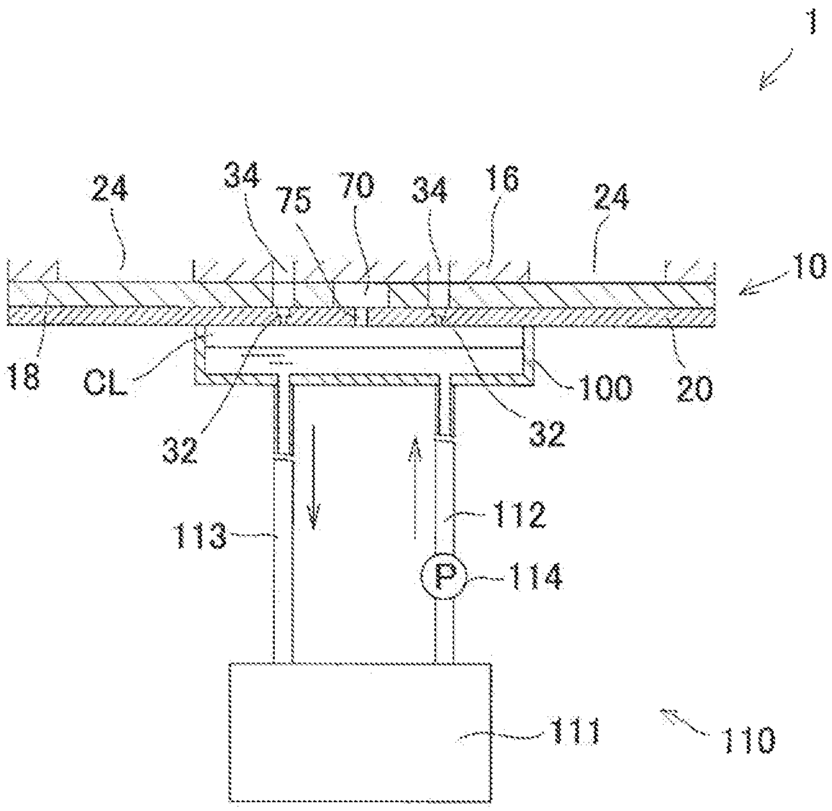
FIG. 14 is a schematic view explaining a recording apparatus according to the fourth embodiment of the present disclosure.

FIG. 10 is a sectional view of a recording head according to a fourth embodiment, and FIG. 11 is a plan view of a passage formation substrate according to the fourth embodiment when viewed in the +Z direction. FIG. 12 is a view explaining a recess and is an enlarged sectional view of the passage formation substrate in the Y-axis direction. FIG. 13 is a view illustrating a modification of the recess according to the fourth embodiment and is a plan view of a part of the passage formation substrate viewed in the −Z direction. FIG. 14 is a view explaining a recording apparatus according to the fourth embodiment. Note that the same members in the figures will be denoted by the same reference signs, and descriptions that overlap the above-described embodiments will be omitted.

The present embodiment is a modification of the circulation passage 70 formed in the passage formation substrate 12, and the configurations other than the passage formation substrate 12 are the same as the first embodiment.

As illustrated in FIGS. 10 and 11, in the same manner as the first embodiment, the passage formation substrate 12 according to the present embodiment includes the pressure chamber substrate 14, the manifold substrate 16, the communication plate 18, and the nozzle plate 20. In addition, the circulation passage 70 is provided so as to pass through the communication plate 18.

In addition, the circulation passage 70 according to the present embodiment is provided in a region between the nozzle line 33A and the nozzle line 33B in the X-axis direction. Moreover, the circulation passage 70 is provided so as to extend in the Y-axis direction and extends over a region where a plurality of nozzles 32 are formed. In other words, the circulation passage 70 according to the present embodiment is configured with only one extending portion 71. In addition, in the circulation passage 70, the inflow hole 73 is coupled to a portion near the end portion in the +Y-axis direction, and the discharge hole 74 is coupled to a portion near the end portion in the −Y direction.

In addition, in the passage formation substrate 12, a plurality of diffusion holes 75 that are in communication with the circulation passage 70 and also open in a liquid ejecting surface in which the nozzles 32 open are formed. That is, in the nozzle plate 20 of the passage formation substrate 12, the diffusion holes 75 that are provided so as to pass through the nozzle plate 20 in the thickness direction and in communication with the circulation passage 70 are formed. In the present embodiment, the opening area of each diffusion hole 75 in the surface of the nozzle plate 20 is larger than the opening area of each nozzle 32.

In addition, the number of the diffusion holes 75 is not particularly limited, but is preferably, for example, the number similar to or larger than the number of the nozzles 32 constituting each of the nozzle lines 33A and 33B. In the present embodiment, the diffusion holes 75 whose number is the same as the number of the nozzles 32 constituting each of the nozzle lines 33A and 33B are disposed in line at the same interval as the interval of the nozzles 32. That is, each diffusion hole 75 opens near each nozzle 32 constituting the nozzle lines 33A and 33B.

In addition, in the surface of the nozzle plate 20 in which the diffusion hole 75 opens, a recess 76 is provided and couples the diffusion holes 75 adjacent to each other. As illustrated in FIG. 12, the recess 76 is provided so as not to pass through the nozzle plate 20 in the thickness direction and is linearly formed in the Y-axis direction.

In this manner, in the present embodiment, the passage formation substrate 12 is provided with each diffusion hole 75 that is in communication with the circulation passage 70 and that opens in the liquid ejecting surface in which the nozzle 32 opens. The cooling water flows into the diffusion hole 75 from the circulation passage 70 and is exposed in the opening of the diffusion hole 75. As a result, humidity around the surface of the nozzle plate 20, that is, around the liquid ejecting surface increases, and each nozzle 32 that opens in the surface of the nozzle plate 20 is moisturized. Accordingly, evaporation of moisture in the ink in the nozzle 32 is suppressed. Therefore, a variation in the ejecting velocity of ink drops can be further suppressed, and the ejecting property can be further stabilized.

In addition, in the present embodiment, the opening area of the diffusion hole 75 in the liquid ejecting surface, that is, the surface of the nozzle plate 20 is larger than the opening area of the nozzle 32. As a result, the area in the diffusion hole 75 where the cooling water is exposed to the open air, that is, the diffusion area is expanded, and thus the cooling water evaporates more easily, as a result of which each nozzle 32 is easily moisturized.

In addition, in the passage formation substrate 12 according to the present embodiment, a plurality of diffusion holes 75 are provided at a prescribed interval, and in the liquid ejecting surface of the passage formation substrate 12, that is, in the surface of the nozzle plate 20, the recess 76 is provided and couples the diffusion holes 75 adjacent to each other. As a result, in each diffusion hole 75, the cooling water evaporates more easily, and each nozzle 32 is more easily moisturized.

Here, the vapor partial pressure of the main solvent of the cooling liquid, which is the second liquid, is preferably higher than the vapor partial pressure of the main solvent of the ink, which is the first liquid. That is, the cooling liquid is preferably a liquid whose moisture evaporates more easily than ink.

Note that the main solvent refers to a solvent component that is contained the most among the solvents in the liquid. For example, in the present embodiment, since water (cooling water) is used as the cooling liquid, the main solvent is also water. Therefore, the vapor partial pressure of the main solvent of the cooling water is higher than the vapor partial pressure of the main solvent of the ink.

In this manner, since the vapor partial pressure of the main solvent of the cooling liquid is higher than the vapor partial pressure of the main solvent of the ink, the cooling liquid evaporates more easily in the diffusion hole 75, and each nozzle 32 is more easily moisturized.

The cooling liquid may contain a solvent other than water. In this case, the main solvent may contain a solvent other than water. The main solvent of the cooling liquid may be, for example, an aqueous organic solvent that is a mixed solvent of water and a water-soluble organic solvent.

Examples of the solvent contained in the cooling liquid other than water include an alkylpolyol, a glycol ether, and a cyclic amide.

Specific examples of the alkylpolyol include 1,2-butanediol, 1,2-pentanediol, 1,2-hexanediol, 1,2-heptanediol, 1,3-propanediol, 1,3-butanediol, 1,4-butanediol, 1,5-pentanediol, 1,6-hexanediol, 2-ethyl-2-methyl-1,3-propanediol, 2-methyl-2-propyl-1,3-propanediol, 2-methyl-1,3-propanediol, 2,2-dimethyl-1,3-propanediol, 3-methyl-1,3-butanediol, 2-ethyl-1,3-hexanediol, 3-methyl-1,5-pentanediol, 2-methylpentane-2,4-diol, diethylene glycol, propylene glycol, dipropylene glycol, triethylene glycol, and glycerol. These alkylpolyols may be used alone or in combination of two or more.

Examples of the glycol ether include monoalkyl ether or dialkyl ether of glycol selected from ethylene glycol, diethylene glycol, triethylene glycol, polyethylene glycol, propylene glycol, dipropylene glycol, tripropylene glycol, polypropylene glycol, and polyoxyethylene polyoxypropylene glycol. More specific examples include methyl triglycol (triethylene glycol monomethyl ether), butyl triglycol (triethylene glycol monobutyl ether), butyl diglycol (diethylene glycol monobutyl ether), and dipropylene glycol monopropyl ether. Typical examples include diethylene glycol monobutyl ether.

Examples of the cyclic amide include γ-lactams, such as 2-pyrrolidone, 1-methyl-2-pyrrolidone (N-methyl-2-pyrrolidone), 1-ethyl-2-pyrrolidone (N-ethyl-2-pyrrolidone), 1-propyl-2-pyrrolidone, and 1-butyl-2-pyrrolidone, β-lactams, δ-lactams and ε-lactams, such as ε caprolactams. These cyclic amides may be used alone or in combination of two or more.

The cooling liquid may further contain other organic solvents. Examples of the other organic solvents include lactones such as γ-butyrolactone, and a betaine compound.

In addition, in the present embodiment, in the nozzle plate 20, the recess 76 that couples the adjacent diffusion holes 75 is linearly provided, but the shape of the recess 76 is not particularly limited. For example, as illustrated in FIG. 13, the recess 76 may be continuously provided over a periphery of each nozzle 32 while coupling the adjacent diffusion holes 75. As a result, the cooling water evaporates more easily in each diffusion hole 75, and each nozzle 32 is more easily moisturized.

In the liquid ejecting apparatus 1 according to the present embodiment, as illustrated in FIG. 14, at a standby position (another name is a home position) of the recording head 10, a cap member 100 is disposed. The cap member 100 is formed into a tray shape that can come into contact with the surface of the nozzle plate 20. In addition, the cap member 100 comes into contact with the surface of the nozzle plate 20 and forms a sealing space CL with which the nozzle 32 is in communication.

The liquid ejecting apparatus 1 includes a flowing apparatus (flowing unit) 110 that supplies a moisturizing liquid, which is a third liquid, into the sealing space CL of the cap member 100 and causes the moisturizing liquid to flow. The flowing apparatus 110 includes a liquid storage 111 that stores the moisturizing liquid, and the liquid storage 111 is in communication with the cap member 100 through a first flowing tube 112 and a second flowing tube 113. A flowing pump 114 is provided in the middle of the first flowing tube 112, and the moisturizing liquid is supplied into the sealing space CL of the cap member 100 from the liquid storage 111 by the flowing pump 114. In addition, the moisturizing liquid in the sealing space CL of the cap member 100 is returned into the liquid storage 111 through the second flowing tube 113.

In this manner, since the moisturizing liquid circulates through the sealing space CL formed by the cap member 100 that is in contact with the surface of the nozzle plate 20, appropriate humidity can be maintained in the cap member 100, and evaporation of the ink in the nozzle 32 can be suppressed. Therefore, a change in the composition, the viscosity, and the like of the ink near the nozzle 32 can be suppressed.

Note that in the cap member 100, an absorber made of a resin form and the like for absorbing the moisturizing liquid may be provided. In addition, the type of the moisturizing liquid, which is the third liquid, is not particularly limited, and may be the same liquid as the cooling liquid, which is the second liquid, or a liquid different from the cooling liquid. The moisturizing liquid may be water, for example, or may contain a solvent other than water. Examples of the solvent contained in the moisturizing liquid include a solvent similar to the solvent contained in the above-described cooling liquid.

Moreover, similarly to the cooling liquid, it is preferable that the vapor partial pressure of the main solvent of the moisturizing liquid is higher than the vapor partial pressure of the main solvent of the ink. That is, it is preferable that, as the moisturizing liquid, a liquid whose moisture evaporates more easily than the ink is used. For example, it is preferable to use a liquid having a higher water content than the ink.

As described above, in the present embodiment, the cap member 100 that comes into contract with the surface of the nozzle plate 20, which is the liquid ejecting surface, and forms the sealing space CL with which the nozzle 32 is in communication, and the flowing apparatus 110 that is a flowing unit that causes the moisturizing liquid, which is the third liquid, to flow in the sealing space CL are included, and the vapor partial pressure of the main solvent of the moisturizing liquid, which is the third liquid, is higher than the vapor partial pressure of the main solvent of the ink, which is the first liquid. As a result, in the sealing space CL of the cap member 100, the moisturizing liquid evaporates more easily than the ink, and evaporation of the ink in the nozzle 32 can be further suppressed.

Other Embodiments

Each embodiment of the present disclosure has been described above thus far, but the basic configuration of the present disclosure is not limited to the above-described configuration.

For example, in each embodiment described above, a configuration including the passage formation substrate 12, the protection substrate 40, the case member 46, and the like is exemplified as the main configuration of the recording head 10, but, needless to say, the configuration of the recording head 10 is not particularly limited. The recording head 10 may include, for example, substrates other than the above-described substrates.

In addition, in the above-described recording apparatus 1, a configuration in which the recording head 10 that is mounded on the transporting body 6 and is reciprocated in the main scanning direction is exemplified, but the configuration of the ink jet recording apparatus is not limited thereto. The ink jet recording apparatus may be, for example, a so-called line type recording apparatus in which the recording head 10 is fixed, and printing is performed by moving only the medium S in a sub-scanning direction. The present disclosure is also applicable to an ink jet recording apparatus having such a configuration.

Note that in the above-described embodiment, an ink jet recording head is exemplified as the liquid ejecting head, and an ink jet recording apparatus is exemplified as the liquid ejecting apparatus, but the present disclosure is widely applicable to all the liquid ejecting heads and the liquid ejecting apparatuses, and needless to say, is applicable to a liquid ejecting head and a liquid ejecting apparatus that eject a liquid other than ink. Examples of other liquid ejecting heads include various types of recording head used for an image recording apparatus such as a printer, a color material ejecting head used for manufacturing a color filter of a liquid crystal display and the like, an electrode material ejecting head used for electrode formation of an organic electroluminescent (EL) display, a field emission display (FED), and the like, a bioorganic material ejecting head used for biochip manufacturing, and the like, and the present disclosure is also applicable to a liquid ejecting apparatus including such a liquid ejecting head.

What is claimed is:

1. A liquid ejecting head comprising:

a plurality of nozzles that are respectively in communication with a plurality of pressure chambers and eject a first liquid in an ejecting direction;

a passage formation substrate that has a liquid passage through which the first liquid flows, the liquid passage extending from a common liquid chamber to the plurality of nozzles, the common liquid chamber communicating with one of the plurality of pressure chambers; and a circulation passage that is formed in the passage formation substrate and is not in communication with the liquid passage, and through which a second liquid circulates, wherein the circulation passage is located between an end of one of the plurality of pressure chambers in an opposite direction of the ejecting direction and a liquid ejecting surface of the passage formation substrate in which the plurality of nozzles open, regarding the ejecting direction.

2. The liquid ejecting head according to claim 1, wherein
the plurality of nozzles are disposed in line in a first direction in the passage formation substrate, and
the circulation passage has an extending portion that is provided in the first direction and extends over a region where the plurality of nozzles are formed.

3. The liquid ejecting head according to claim 2, wherein
the circulation passage has a plurality of extending portions,
adjacent extending portions are coupled on one end side in the first direction, and
the second liquid flows in different directions in the adjacent extending portions.

4. The liquid ejecting head according to claim 2, wherein
the extending portion is provided on each side of the plurality of nozzles in a second direction orthogonal to the first direction.

5. The liquid ejecting head according to claim 1, wherein
the circulation passage is provided at a position where the circulation passage overlaps one of the plurality of pressure chambers and the common liquid chamber in a thickness direction of the passage formation substrate.

6. The liquid ejecting head according to claim 1, wherein
the passage formation substrate is provided with a diffusion hole that is in communication with the circulation passage and opens in the liquid ejecting surface.

7. The liquid ejecting head according to claim 6, wherein
an opening area of the diffusion hole in the liquid ejecting surface is larger than an opening area of one of the plurality of nozzles.

8. The liquid ejecting head according to claim 6, wherein
a plurality of diffusion holes are provided at a prescribed interval in the passage formation substrate, and
a recess that couples adjacent diffusion holes is provided in the liquid ejecting surface of the passage formation substrate.

9. The liquid ejecting head according to claim 6, wherein
a vapor partial pressure of a main solvent of the second liquid is higher than a vapor partial pressure of a main solvent of the first liquid.

10. The liquid ejecting head according to claim 1, wherein
the passage formation substrate has a pressure chamber substrate in which the plurality of pressure chambers are provided,
the passage formation substrate has a nozzle plate in which the plurality of nozzles are provided, and
the circulation passage is located between the pressure chamber substrate and the nozzle plate.

11. The liquid ejecting head according to claim 1, further comprising:
a vibration plate configured to generate a pressure change in the first liquid in the plurality of pressure chambers by deforming the vibration plate, wherein
the passage formation substrate has a nozzle plate in which the plurality of nozzles are provided and
the circulation passage is located between the vibration plate and the nozzle plate.

12. The liquid ejecting head according to claim 1, wherein
the passage formation substrate has a nozzle plate which has the liquid ejecting surface,
the passage formation substrate has a communication plate which is stacked on a surface of the nozzle plate that is opposite from the liquid ejecting surface, and
the circulation passage is formed in the communication plate.

13. The liquid ejecting head according to claim 1, further comprising:
a vibration plate configured to generate a pressure change in the first liquid in the plurality of pressure chambers by deforming the vibration plate, wherein
the end of one of the plurality of pressure chambers is defined by a surface of the vibration plate facing the ejecting direction.

14. The liquid ejecting head according to claim 1, wherein
the circulation passage is provided at a position where the circulation passage overlaps one of the plurality of pressure chambers in the ejecting direction.

15. The liquid ejecting head according to claim 1, wherein
the circulation passage is provided at a position where the circulation passage overlaps the common liquid chamber in the ejecting direction.

16. The liquid ejecting head according to claim 1, wherein
the circulation passage is provided between the plurality of nozzles.

17. The liquid ejecting head according to claim 16, wherein
the plurality of nozzles are provided in a first nozzle line and a second nozzle line in the passage formation substrate,
the first nozzle line is disposed so as to be one line in a first direction, and
the second nozzle line is disposed so as to be one line in the first direction and to be apart from the first nozzle line in a second direction orthogonal to the first direction, and
the circulation passage is provided between the first nozzle line and the second nozzle line in the second direction.

18. A liquid ejecting apparatus comprising
the liquid ejecting head according to claim 1.

19. The liquid ejecting apparatus according to claim 18, further comprising:
a cap member that comes into contact with the liquid ejecting surface and that forms a sealing space with which the plurality of nozzles are in communication; and
a flowing unit that causes a third liquid to flow in the sealing space, wherein
a vapor partial pressure of a main solvent of the third liquid is higher than a vapor partial pressure of a main solvent of the first liquid.

* * * * *